US011074154B2

(12) United States Patent
Mitchell et al.

(10) Patent No.: US 11,074,154 B2
(45) Date of Patent: Jul. 27, 2021

(54) IDENTIFYING A SOURCE FILE FOR USE IN DEBUGGING COMPILED CODE

(71) Applicant: INTERNATIONAL BUSINESS MACHINES CORPORATION, Armonk, NY (US)

(72) Inventors: Timothy J. Mitchell, Chandlers Ford (GB); Graham C. Charters, Hampshire (GB); Lewis Evans, Berks (GB); Adam J. Pilkington, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 16/000,961

(22) Filed: Jun. 6, 2018

(65) Prior Publication Data
US 2019/0377662 A1    Dec. 12, 2019

(51) Int. Cl.
*G06F 11/36* (2006.01)
*G06F 8/41* (2018.01)

(52) U.S. Cl.
CPC ........... *G06F 11/3624* (2013.01); *G06F 8/41* (2013.01); *G06F 11/3664* (2013.01)

(58) Field of Classification Search
CPC . G06F 11/362; G06F 8/41; G06F 8/53; G06F 8/75; G06F 11/3688; G06F 11/3664; G06F 11/3624; G06F 8/30
See application file for complete search history.

(56) References Cited

U.S. PATENT DOCUMENTS

| 6,178,548 | B1 | 1/2001 | Hickman et al. |
| 9,009,678 | B2 | 4/2015 | Bates |
| 9,348,624 | B2 | 5/2016 | Aniszczyk et al. |
| 2005/0144599 | A1* | 6/2005 | Styles ................. G06F 11/3624 717/140 |
| 2008/0209401 | A1* | 8/2008 | Fanning .................... G06F 8/53 717/124 |
| 2009/0049430 | A1* | 2/2009 | Pai ....................... G06F 9/44589 717/140 |
| 2010/0083224 | A1* | 4/2010 | Arnold ..................... G06F 8/656 717/110 |
| 2013/0247007 | A1* | 9/2013 | Fuhrer .................. G06F 11/362 717/129 |
| 2015/0046911 | A1* | 2/2015 | Lebert ..................... G06F 8/443 717/152 |

(Continued)

OTHER PUBLICATIONS

Philippe Moret et al.; Polymorphic Bytecode Instrumentation; ACM; pp. 129-140; retrieved on Mar. 22, 2021 (Year: 2011).*

(Continued)

*Primary Examiner* — S. Sough
*Assistant Examiner* — Cuong V Luu
(74) *Attorney, Agent, or Firm* — Robert D. Bean

(57) ABSTRACT

Method and system are provided for identifying a source file for use in debugging compiled code. The method includes referencing a compiled file for debugging and searching for potential source files of the compiled file from configured repositories. The method obtains the potential source files from the configured repositories and iterates over the obtained potential source files to compile and compare each potential source file to the compiled file. One or more matching source files are identified for use in debugging the compiled file.

16 Claims, 7 Drawing Sheets

(56) References Cited

U.S. PATENT DOCUMENTS

2018/0285101 A1\* 10/2018 Yahav ..................... G06F 8/75
2019/0087550 A1\* 3/2019 Kim ..................... G06F 21/105

OTHER PUBLICATIONS

Walter Binder et al.; Advanced Java Bytecode Instrumentation; ACM; pp. 135-144; retrieved on Mar. 22, 2011 (Year: 2007).\*
Robbins, "PDB Files: What Every Developer Must Know", Wintellect-Blogs, Mar. 8, 2014, 14 pages.
Mell et al., "The NIST Definition of Cloud Computing", Recommendations of the National Institute of Standards and Technology, Special Publication 800-145, Sep. 2011, 7 pages.

\* cited by examiner

IDENTIFYING A SOURCE FILE FOR USE IN DEBUGGING COMPILED CODE

BACKGROUND

The present invention relates to debugging compiled code, and more specifically, to identifying a source file for use in debugging compiled code.

In order to step debug through code using a debugging tool, it is necessary to have the source code that matches the compiled binary being debugged. During compilation, debug flags instruct the compiler to generate a mapping table that maps the line numbers in the source to lines in the resulting binary.

Often, when debugging, the source code is not readily available (for example, not included with the binaries) and it is also often not easy to locate the correct source (for example, a specific revision from a source or release repository). In these circumstances, the user is only able to view callstack and variables but not the code logic that causes calls to be made and changes to values. This is therefore of very limited value to the user.

There are several decompilers available that will generate source from the compiled binary. However, the decompiled source is not usable in a generated form for debugging because its line numbers do not line up with those stored in the compiled binary being debugged.

SUMMARY

According to an aspect of the present invention there is provided a computer-implemented method for identifying a source file for use in debugging compiled code, comprising: referencing a compiled file of non human-readable form for debugging; searching for potential source files of the compiled file from configured repositories; obtaining the potential source files from the configured repositories; iterating over the obtained potential source files to compile and compare each potential source file to the compiled file; and identifying one or more matching source files for use in debugging the compiled file.

According to another aspect of the present invention there is provided a system for identifying a source file for use in debugging compiled code, comprising: a processor and a memory configured to provide computer program instructions to the processor to execute the function of the components: a compiled file input component for referencing a compiled file of non human-readable form for debugging; a source file matching component for searching for potential source files of the compiled file from configured repositories; a source file obtaining component for obtaining the potential source files from the configured repositories; a comparing component for iterating over the obtained potential source files to compile and compare each potential source file to the compiled file; and a source file output component for identifying one or more matching source files for use in debugging the compiled file.

According to another aspect of the present invention there is provided a computer program product for identifying a source file for use in debugging compiled code, the computer program product comprising a computer readable storage medium having program instructions embodied therewith, the program instructions executable by a processor to cause the processor to: reference a compiled file of non human-readable form for debugging; search for potential source files of the compiled file from configured repositories; obtain the potential source files from the configured repositories; iterate over the obtained potential source files to compile and compare each potential source file to the compiled file; and identify one or more matching source files for use in debugging the compiled file.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The described method and system identify source files for use in debugging compiled code. The method and system match a correct revision of the source file, to the compiled code being debugged. Using user defined source repositories, both local and remote, the system works out which source file matches the executing compile code, by compiling each source file and comparing the resulting compiled code with the executing compiled code. The matching source file may then be presented to the user for use in a debugging tool.

The description refers to compiled code in the form of binary files or classes; however, the compiled code may be any non human-readable file. For example, a compiled file may be a Java compiled class or an obfuscated file such as a minified JavaScript file (Java and JavaScript are trademarks of Oracle Corporation).

Figure 1:
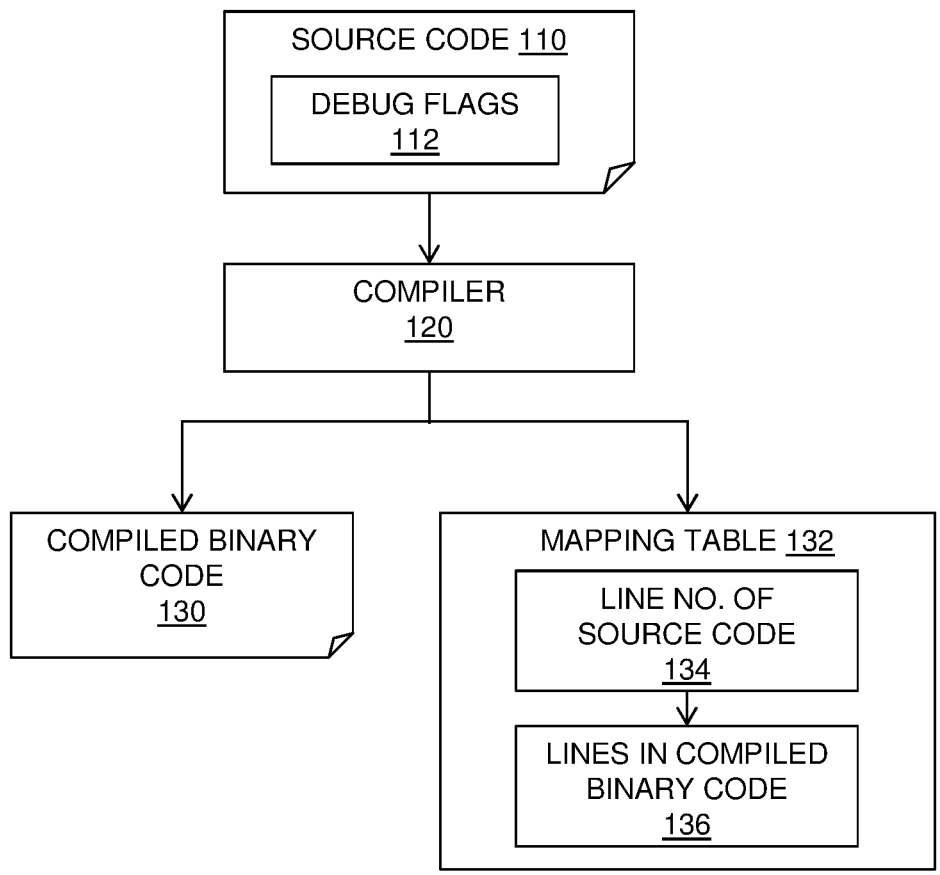
FIG. 1 is a schematic diagram illustrating compilation and debugging of compiled code.
Figure 1:
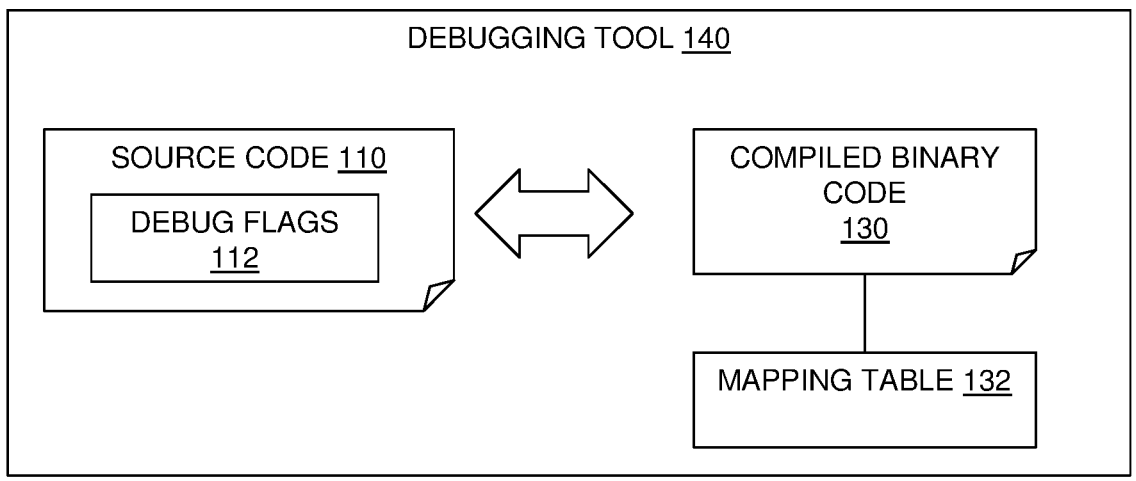

Referring to FIG. 1, a schematic diagram illustrates an example embodiment of a compilation and debugging processes.

During a compilation process of a source code 110 to a compiled non human-readable form such as a binary form of object code, debug flags 112 in the source code 110 instruct the compiler 120 to reference line numbers in the source code to lines in a resulting compiled binary code 130. The object files of the compiled binary code 130 may contain metadata used for debugging. The compiler 120 generates a mapping table 132 mapping line numbers 134 in the source code 110 to lines 136 in the compiled binary code 130.

A debugging tool 140 is used to test and debug compiled binary code 130 referencing the mapping table 132. The debugging tool 140 examines the real-time results of executed the compiled binary code by stepping through the binary code. It is necessary to have the source code 110 that matches the compiled binary code 130 being debugged. Otherwise, any displayed values cannot be interpreted and related back to lines of source code.

Stepping refers to causing the debugger to execute code one executable instruction at a time. A compiler-generated pointer indicates the address of the next sequential instruction to be executed. A line of source code may generate multiple executable instructions, including those which branch to other areas of the source code. The programmer may examine the state of the program, machine, and related data before and after execution of a particular executable instruction. This allows evaluation of the effects of that statement or instruction in isolation and thereby gain insight into the behavior of the executing program. However, without the source code corresponding to the compiled binary code, debugging a software failure requires additional steps, including locating the source code, possibly recompiling to enable the trace function, and causing the failure to occur again. In the case of an enterprise production system, having to incur additional system outages is costly. Additionally, it can be the case that the type of software failure is not easily reproducible. Therefore, the importance of being prepared to perform root cause analysis becomes more critical. By providing an alternative to debugging software failures, the described embodiments of the present invention tend to improve computer reliability, availability, and serviceability.

Figure 2:
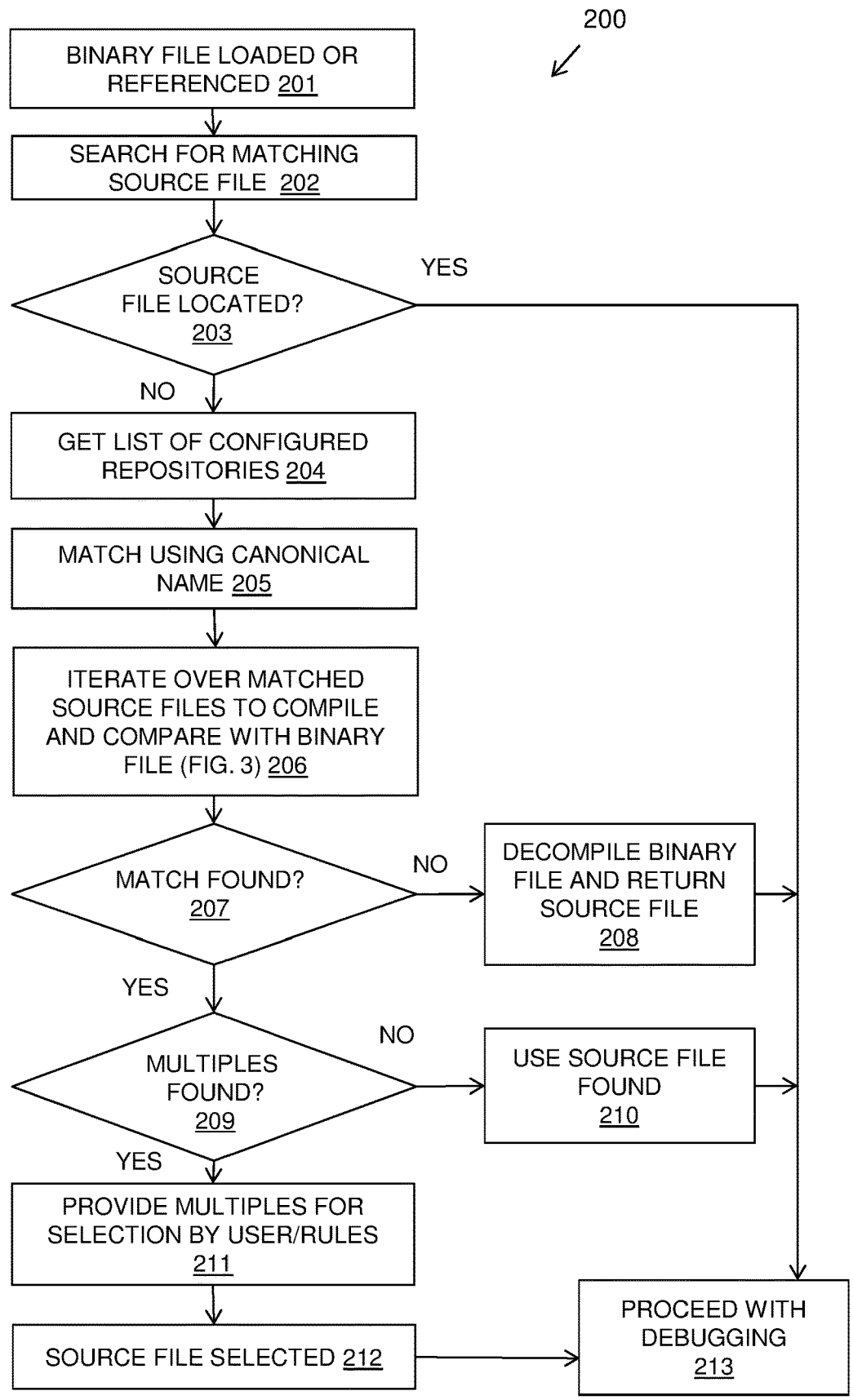
FIG. 2 is a flow diagram of an example embodiment of an aspect of a method in accordance with the present invention.

Referring to FIG. 2, a flow diagram 200 shows an example embodiment of a method of identifying a source file for use in a debugging process of a compiled non human-readable file such as a binary file.

In this embodiment, the method works on-demand, i.e. at the point the debugging tool needs to step through a binary file with no source file available. The on-demand method may look for matching source files when the user attempts to debug the compile file.

Other embodiments may do the processing at a different time, for example, at server start or on a background thread. These other options are ahead-of-time methods where the system attempts to find the matching source file before the user needs it, so when a user requests a source file, it is available immediately. The server start or background thread may decide to match source for all files even if they are not ultimately used.

In one embodiment, the described method may use Java (Java is a trade mark of Oracle Corporation) as the runtime platform, and Eclipse (Eclipse is a trade mark of Eclipse Foundation) as the integrated development environment (IDE) including a debugging tool and the method may be carried out by a virtual machine or Java agent and the binary file may be a binary class.

The binary file may be loaded or referenced (for example, if the method is being carried out prior to debugging) 201 and a search 202 for the source file carried out. The search may be carried out by name or by other methods.

For example, the search 202 may search the classpath for a matching ".java" file for the class being loaded. The classpath gives an ordered list of locations that the Java Virtual Machine will search in order to find classes required by the application. Locations in the classpath may contain source files as well. Java source files are identified by the matching name with a ".java" suffix, for example, "Test.java" would be a potential match for "Test.class" but not for "TestA.class".

It may be determined 203 if the source file has been located. If it has been located, the debugging process may proceed 213 with the located source file or, if the process is carried out ahead of a debugging, the source file may be referenced to the compiled binary file.

If there is no source file found, a list of all configured source repositories may be obtained 204. A user may configure a number of source repositories into the IDE such as local directories containing source, or remote repositories. For example, remote repositories may include code source engines for developers to search and browse open source projects.

All source files may be found from the configured repositories that match 205 the canonical or official name. For example, the method may extract all versions of a file from a repository.

The method may iterate 206 over the found source files to compile each source file and compare it with the binary file. Further details of this aspect of the method are described with reference to FIG. 3.

It may then be determined 207 if a matching source file is found by the iterating method 206. In the event of no matching source file being found, the original bytecode in the form of the instruction set encoding the result of the compiler parsing and semantic analysis of the binary file may be decompiled 208, and returned as the source file. The debugging process may proceed 213 using the decompiled source file or, if the process is carried out ahead of a debugging, the decompiled source file may be referenced to the compiled binary file.

If at least one matching source file is found, it may be determined 209 if multiple source files have been found. If only one source file has been found, this source file may be used 210 and the debugging process may proceed 213 using the source file or, if the process is carried out ahead of a debugging, the source file may be referenced to the compiled binary file.

In the event of multiple identical bytecode matches being found, a number of options may be provided 211 to the user. For example, these may be presented in a merged source file, a list may be provided for the user to choose from, or user defined rules may be used to select on, such as timestamps, which repositories the source was found in, etc.

A source file may be selected 212 and the debugging process may proceed 213 using the decompiled source file or, if the process is carried out ahead of a debugging, the source file may be referenced to the compiled binary file.

Figure 3:
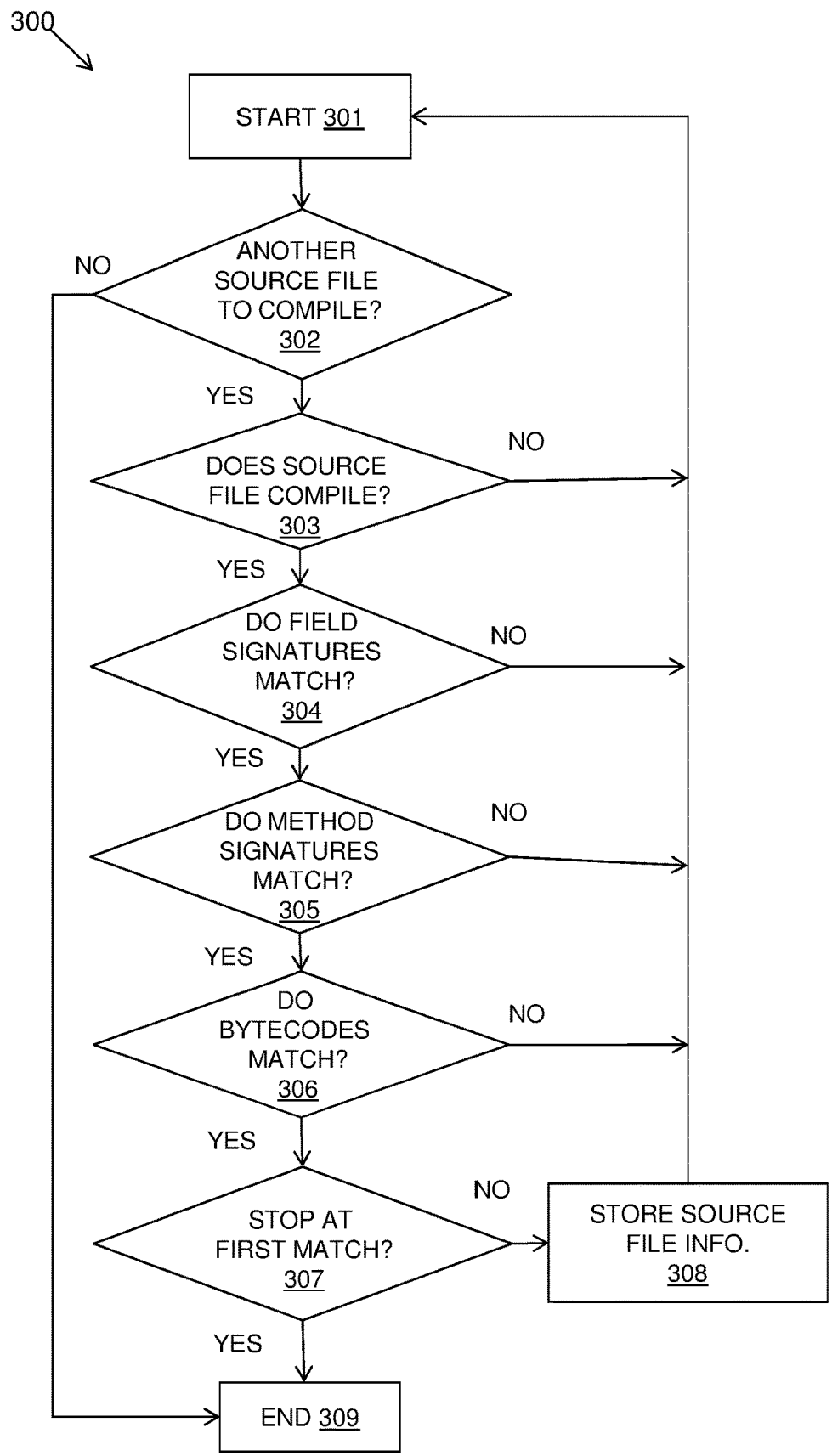
FIG. 3 is a flow diagram of an example embodiment of a further aspect of a method in accordance with the present invention.

Referring to FIG. 3, a flow diagram 300 shows the method at step 206 of FIG. 2 that may iterate over the found source files to compile each source file and compare it with the binary file. Further details of this aspect of the method are described.

The method may start 301 and determine 302 if there is a first/another source file to compile from the found source files. If there are not further source files, the method may end 309. If there is another source file, it may be determined 303 if the source file compiles. If it does not compile, the method may return to the start 301.

If the source file does compile, it may be determined 304 if the field signatures of the compiled source file match those of the binary file. If they do not match, the method may return to the start 301. Fields are variables/constants within the class that have their own name and datatype. The field match compares name and datatype.

If the field signatures match, it may be determined 305 if the method signatures of the compiled source file match those of the binary file. If they do not match, the method may return to the start 301. The method signature is composed of a method name and an ordered list of one or more parameters, with each parameter having its own datatype. The method signature match compares the method name and datatypes of the parameters. If this match fails, this candidate method can be ignored.

If the field and method signatures match, it may be determined 306 if the bytecodes match. If they do not match, the method may return to the start 301.

If the bytecodes match, it may be determined 307 if the method should stop at the first match. If so, the method may end 309 with the matched source file. If additional matches are sought, the matching source file information may be stored 308 and the method may return to the start 301 to find additional source file matches.

The matching of field signatures, method signatures and bytecodes may be carried out in a different order. Alternatively, only one or two of the group of: field signatures, method signatures, and bytecodes may be used for matching.

For performance reasons, the field signature match, followed by the method signature match, and then finally the bytecode matches of the matched fields and methods are carried out in this embodiment. The reason for this order is that field matches are relatively cheap whereas bytecode matches are relatively expensive, so it is preferable to carry out as few bytecode comparisons as possible.

Figure 4:
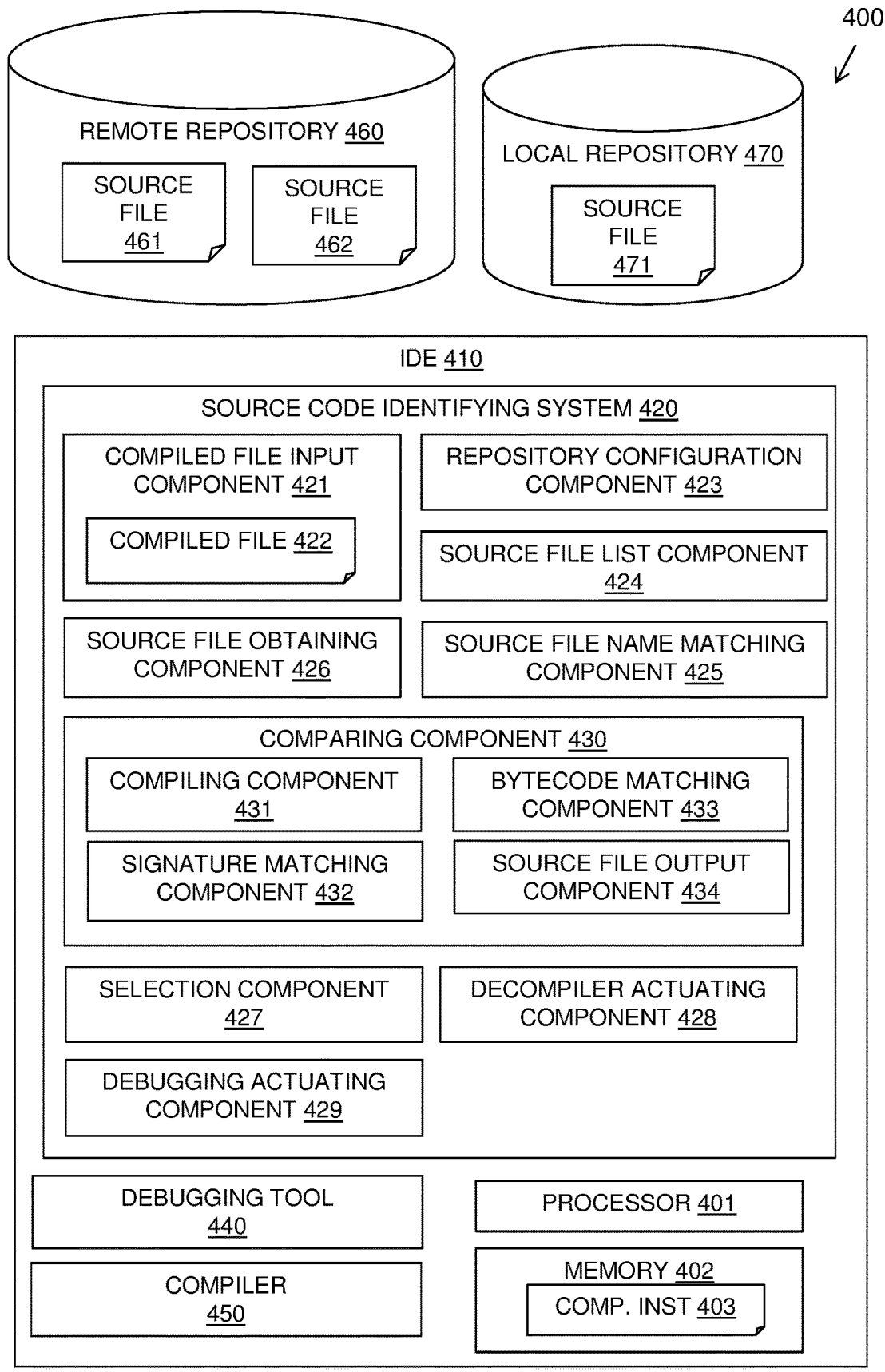
FIG. 4 is block diagram of an example embodiment of a system in accordance with the present invention.

Referring to FIG. 4, a block diagram shows an example embodiment of the described system 400. The system 400 shows an IDE 410 that includes a debugging tool 440.

The IDE 410 may run on a computer system having at least one processor 401, a hardware module, or a circuit for executing the functions of the described components which may be software units executing on the at least one processor. Multiple processors running parallel processing threads may be provided enabling parallel processing of some or all of the functions of the components. Memory 402 may be configured to provide computer instructions 403 to the at least one processor 401 to carry out the functionality of the components.

The IDE 410 may include a source code identifying system 420 for identifying source files for a compiled file in the form of a non human-readable file such as a binary file for use by the debugging tool 440. The source code identifying system 420 may include a compiled file input component 421 for receiving a compiled file 422 to be debugged or for referencing a compiled file 422 ahead of a debugging process.

The source code identifying system 420 may include a repository configuration component 423 for user configuration of a number of source repositories 460, 470 into the IDE 410 such as local directories 470 containing source files 471 or remote repositories 460 containing source files 461, 462. For example, remote repositories may include code source engines for developers to search and browse open source projects.

The source code identifying system 420 may include a source file list component 424 for obtaining a list of source files from the configured repositories and a source file name matching component 425 for locating source files with a name corresponding to an input compiled binary file 422. The source file name matching component 425 may search for source files using a canonical or official name of the source file.

The source code identifying system 420 may include a source file obtaining component 426 for extracting all versions of matched source files from the repositories for further processing.

The source code identifying system 420 may include a comparing component 430 for iterating a comparing process for each of the extracted matched source files. The comparing component 430 may include a compiling component 431 for instigating a compiling of a source file by a compiler 450 that may be provided by the IDE 410.

The comparing component 430 may include a signature matching component 432 for matching field and/or method signatures of a compiled source file with the input compiled binary file 422. The comparing component 430 may include a bytecode matching component 433 for matching the compiled source file byte with the bytecode of the input compiled binary file 422. The comparing component 430 may include a source file output component 434 for outputting one or more matched source files.

The source code identifying system 420 may include a selection component 427 for selecting one of multiple matched source files as output by the comparing component 430. The selection component 427 may provide multiple matched source code files to the user or may apply rules for selection of the source code file.

The source code identifying system 420 may include a decompiler actuating component 428 for decompiling the input compiled binary file 422 if no matched source file is output by the comparing component 430.

The source code identifying system 420 may include a debugging actuating component 429 for actuating the debugging process of the debugging tool 440 for the input compiled binary file 422 using the selected matched source file or the decompiled input binary file.

Figure 5:
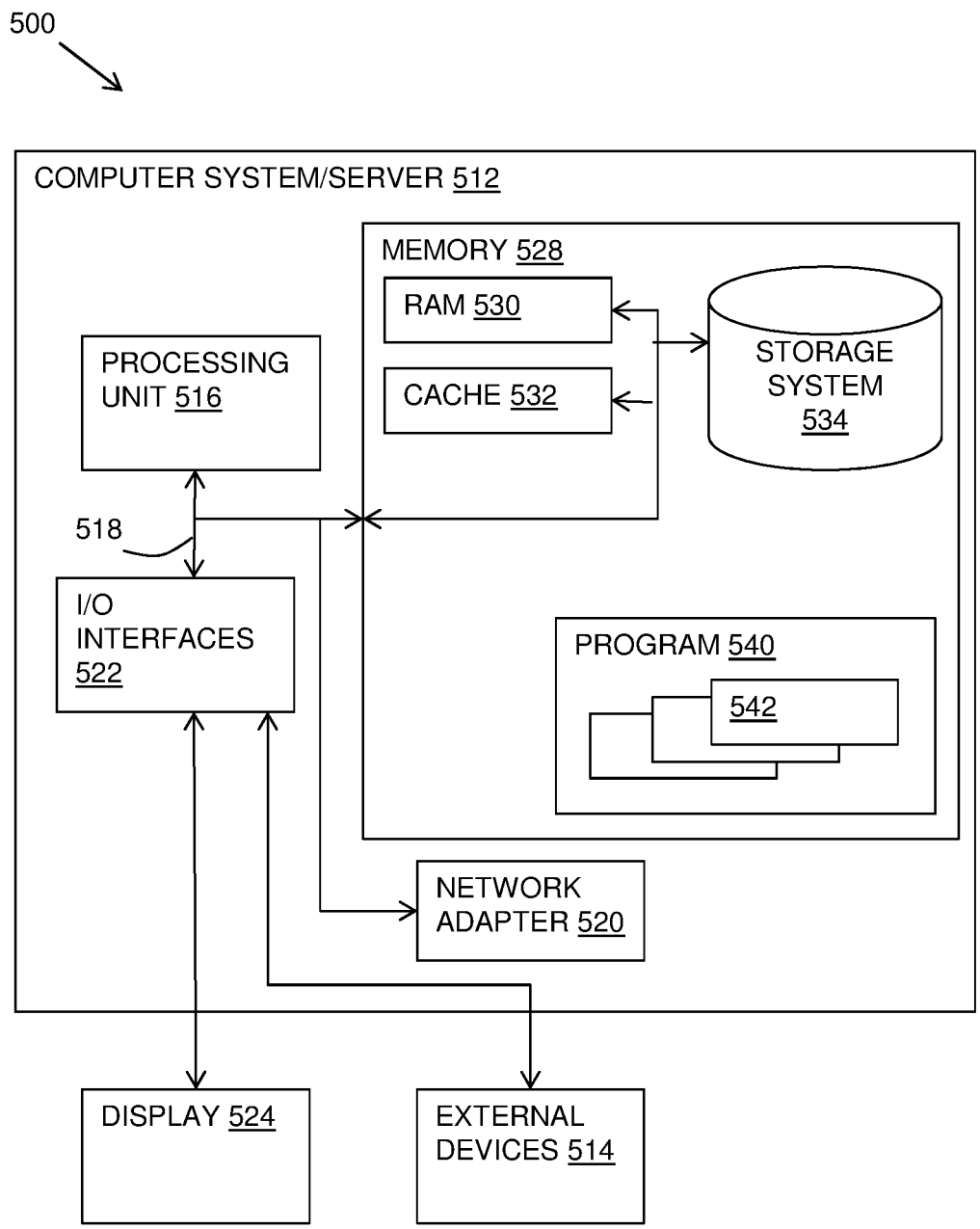
FIG. 5 is a block diagram of an embodiment of a computer system or cloud server in which the present invention may be implemented.

Referring now to FIG. 5, a schematic of an example of a system 500 in the form of a computer system or server is shown.

A computer system or server 512 may be operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

In FIG. 5, a computer system/server 512 is shown in the form of a general-purpose computing device. The components of the computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
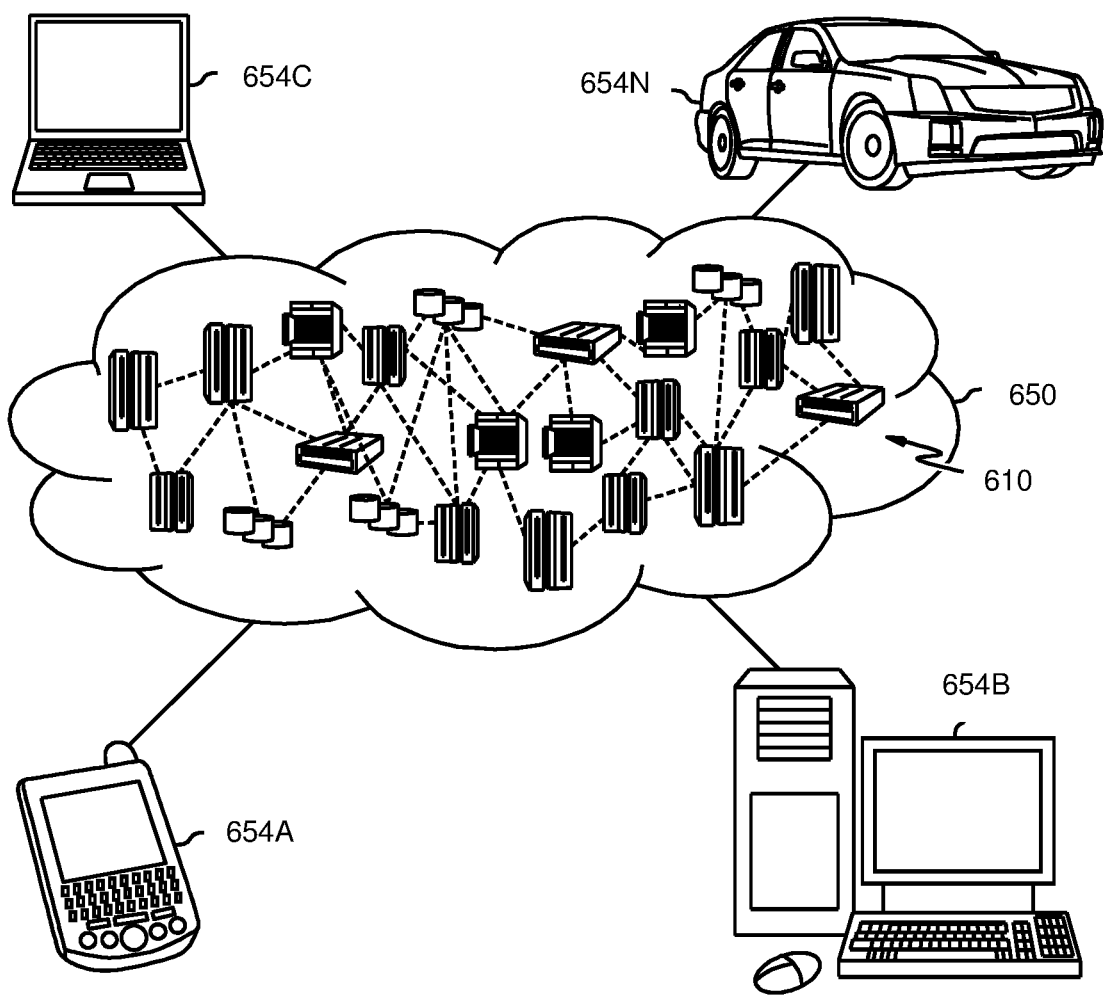
FIG. 6 is a schematic diagram of a cloud computing environment in which the present invention may be implemented.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
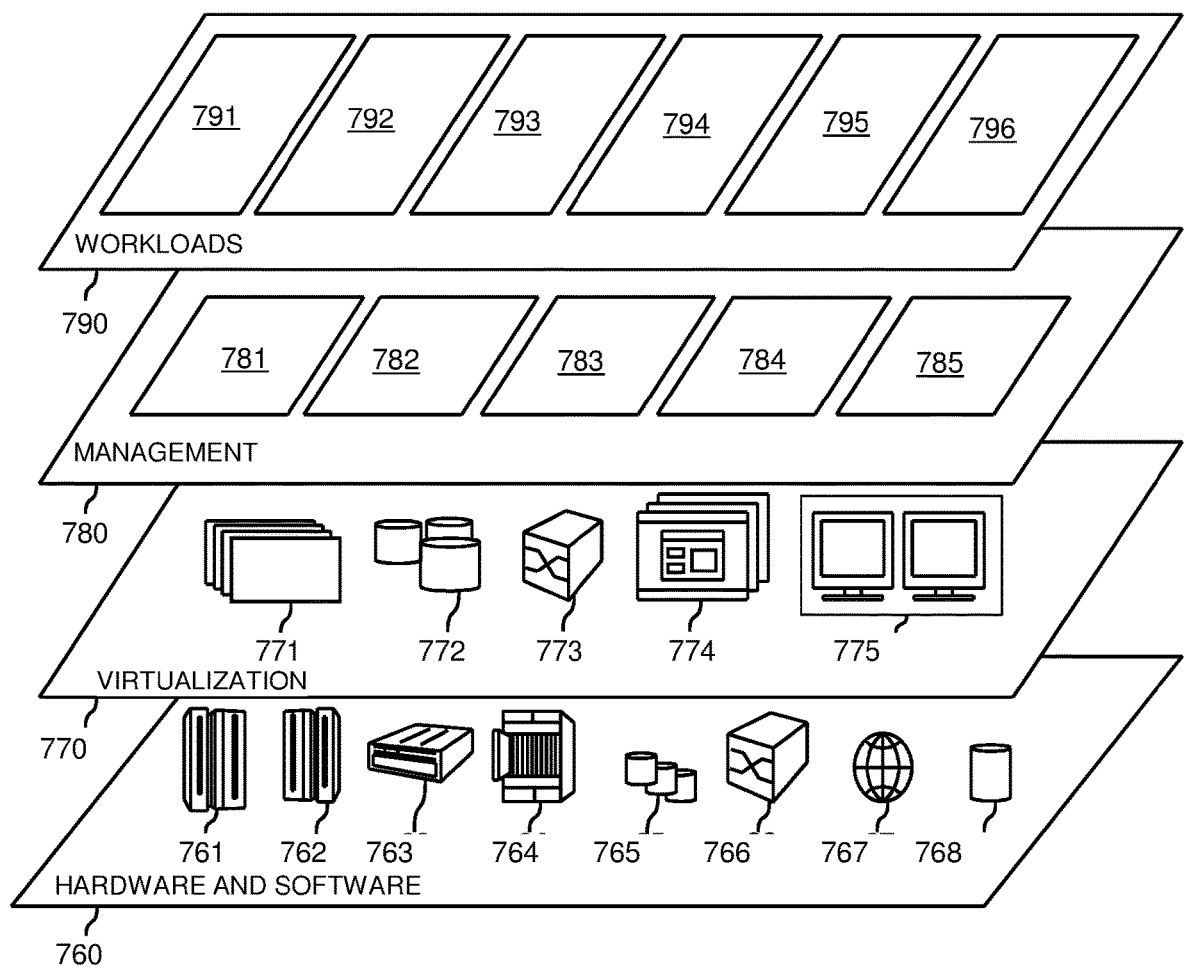
FIG. 7 is a diagram of abstraction model layers of a cloud computing environment in which the present invention may be implemented.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and code debugging processing 796.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for identifying one or more source files for use in debugging compiled code, comprising:

receiving a binary file with no corresponding source file available;

extracting two or more source files from one or more source repositories;

compiling the two or more source files;

determining that one or more field signatures or method signatures of at least one of the two or more compiled source files match one or more field signatures or method signatures, respectively, of the binary file;

responsive to the determining, identifying that a plurality of bytecodes of the at least one of the two or more compiled source files match a plurality of bytecodes of the binary file; and responsive to the identifying, determining that the at least one of the two or more source files as corresponding with the binary file.

2. The method as claimed in claim 1, further comprising:
configuring the one or more source repositories, wherein the one or more source repositories contain the two or more source files.

3. The method as claimed in claim 1, comprising:
responsive to identifying a plurality of source files as corresponding with the binary file, selecting a most recent source file from the plurality of source files.

4. The method as claimed in claim 1, comprising:
responsive to identifying a plurality of source files as corresponding with the binary file, selecting one of the plurality of source files based on an originating location of the plurality of source files.

5. The method as claimed in claim 1, wherein if no source file is identified as corresponding with the binary file, decompiling the binary file and using a decompiled output in debugging the binary file.

6. The method as claimed in claim 1, wherein the method is carried out at a point a debugging tool needs to step through the binary file with no source file available.

7. The method as claimed in claim 1, wherein the method is carried out at server start or on a background thread prior to a debugging tool requiring a source file.

8. A system for identifying one or more source files for use in debugging compiled code, comprising:
one or more processors, one or more computer-readable memories, one or more computer readable tangible storage media, and program instructions stored on at least one of the one or more tangible storage media for execution by at least one of the one or more processors via at least one of the one or more memories, wherein the system is capable of performing a method comprising:
receiving a binary file with no corresponding source file available;
extracting two or more source files from one or more source repositories;
compiling the two or more source files;
determining that one or more field signatures or method signatures of at least one of the two or more compiled source files match one or more field signatures or method signatures, respectively, of the binary file;
responsive to the determining, identifying that a plurality of bytecodes of the at least one of the two or more compiled source files match a plurality of bytecodes of the binary file; and
responsive to the identifying, determining that the at least one of the two or more source files as corresponding with the binary file.

9. The system as claimed in claim 8, further comprising:
configuring the one or more source repositories, wherein the one or more source repositories contain the two or more source files.

10. The system as claimed in claim 8, comprising:
responsive to identifying a plurality of source files as corresponding with the binary file, selecting a most recent source file from the plurality of source files.

11. The system as claimed in claim 8, comprising:
responsive to identifying a plurality of source files as corresponding with the binary file, selecting one of the plurality of source files based on an originating location of the plurality of source files.

12. The system as claimed in claim 8, wherein if no source file is identified as corresponding with the binary file, decompiling the binary file and using a decompiled output in debugging the binary file.

13. The system as claimed in claim 8, wherein the system is provided as part of an integrated development environment including a debugging tool.

14. The system as claimed in claim 13, wherein the system is activated at a point the debugging tool needs to step through the binary file with no source file available.

15. The system as claimed in claim 8, wherein the system is activated at a server start or on a background thread prior to a debugging tool requiring a source file.

16. A computer program product for identifying one or more source files for use in debugging compiled code, the computer program product comprising a computer readable storage medium having program instructions embodied therewith, the program instructions executable by a processor to cause the processor to perform a method comprising:
receiving a binary file with no corresponding source file available;
extracting two or more source files from one or more source repositories;
compiling the two or more source files;
determining that one or more field signatures or method signatures of at least one of the two or more compiled source files match one or more field signatures or method signatures, respectively, of the binary file;
responsive to the determining, identifying that a plurality of bytecodes of the at least one of the two or more compiled source files match a plurality of bytecodes of the binary file; and
responsive to the identifying, determining that the at least one of the two or more source files as corresponding with the binary file.

* * * * *